(12) United States Patent
Hasler

(10) Patent No.: US 10,619,957 B2
(45) Date of Patent: Apr. 14, 2020

(54) DEVICE FOR LOCKING A SHELL AND STRETCHER COMPRISING SUCH A LOCKING DEVICE

(71) Applicant: NEXTER SYSTEMS, Roanne (FR)

(72) Inventor: Jean-Luc Hasler, Bourges (FR)

(73) Assignee: NEXTER SYSTEMS, Roanne (FR)

( * ) Notice: Subject to any disclaimer, the term of this patent is extended or adjusted under 35 U.S.C. 154(b) by 0 days.

(21) Appl. No.: 16/316,886

(22) PCT Filed: Jul. 31, 2017

(86) PCT No.: PCT/FR2017/052154
§ 371 (c)(1),
(2) Date: Jan. 10, 2019

(87) PCT Pub. No.: WO2018/024978
PCT Pub. Date: Feb. 8, 2018

(65) Prior Publication Data
US 2019/0293373 A1 Sep. 26, 2019

(30) Foreign Application Priority Data
Aug. 1, 2016 (FR) ...................... 16 01180

(51) Int. Cl.
*F41A 9/21* (2006.01)
*F41A 9/06* (2006.01)
(Continued)

(52) U.S. Cl.
CPC ...... *F41A 9/21* (2013.01); *F41A 9/06* (2013.01); *B25J 15/0038* (2013.01); *F41A 9/87* (2013.01)

(58) Field of Classification Search
CPC ... B66C 1/625; B66C 1/42; F41A 9/21; F41A 9/87; F41A 9/06; B25J 15/0038; B25J 15/0206
See application file for complete search history.

(56) References Cited

U.S. PATENT DOCUMENTS 3,804,453 A * 4/1974 Walden .............. B66C 1/42
294/110.1
6,010,536 A * 1/2000 Veatch ............... A61F 2/588
414/6

(Continued)

FOREIGN PATENT DOCUMENTS

EP 0 406 716 A1 1/1991
EP 1 164 347 A2 12/2001

OTHER PUBLICATIONS

Nov. 7, 2017 International Search Report issued in International Patent Application No. PCT/FR2017/052154.
(Continued)

*Primary Examiner* — Gerald McClain
(74) *Attorney, Agent, or Firm* — Oliff PLC

(57) ABSTRACT

A jaw pivoting about an axis for clamping the shell, a lower end of the jaw receives the shell to allow closure. The notch intended to interfere with a catch of a cam to retain the jaw in the closed position. The cam is rigidly connected to a pivoting lever which allows the catch to be moved from the path of the notch to allow the jaw to open. The lever is to be pivotally activated through the force of an external component. The device includes a first and second spring each acting on the lever in an opposing manner, the second spring being stiffer than the first spring. The effect of the first spring is to lift the lever. The second spring counters the action of the first spring in order to delay the lifting of the lever and the catch when removing the component.

9 Claims, 5 Drawing Sheets

(51) Int. Cl.
F41A 9/87 (2006.01)
B25J 15/00 (2006.01)

(56) References Cited

U.S. PATENT DOCUMENTS

| | | | | |
|---|---|---|---|---|
| 7,341,295 | B1* | 3/2008 | Veatch | A61F 2/588 |
| | | | | 294/106 |
| 2002/0029687 | A1* | 3/2002 | Heldmann | F42B 39/22 |
| | | | | 89/46 |
| 2013/0249229 | A1* | 9/2013 | Roberts | B25J 15/0226 |
| | | | | 294/198 |
| 2014/0194903 | A1* | 7/2014 | Malkowski | A61B 17/1285 |
| | | | | 606/143 |
| 2019/0039240 | A1* | 2/2019 | Wagner | B25J 9/1612 |
| 2019/0276175 | A1* | 9/2019 | Nava | B65G 47/847 |
| 2019/0293373 | A1* | 9/2019 | Hasler | F41A 9/21 |

OTHER PUBLICATIONS

Nov. 7, 2017 Written Opinion issued in International Patent Application No. PCT/FR2017/052154.

Mar. 29, 2017 Preliminary Search Report issued in French Patent Application No. 1601180.

Mar. 29, 2017 Written Opinion issued in French Patent Application No. 1601180.

* cited by examiner

DEVICE FOR LOCKING A SHELL AND STRETCHER COMPRISING SUCH A LOCKING DEVICE

The technical field of the invention is that of the devices for locking and gripping shells.

Shells of artillery pieces are particularly heavy, weighing between 25 and 47 kg on average, which makes them delicate to handle. In order to grasp them easily, known from U.S. Pat. No. 3,804,453 is a clamp comprising a pair of jaws closing on a shell to be grasped when the shell bears on the base of each jaw. Each jaw comprises a rack comprising teeth that interfere with a catch that locks each jaw in closed position. A spring tends to keep the catch in a position interfering with the teeth of the rack. To release the shell, an operator must pivot a lever that acts against the force of the spring and releases the catches from the pivoting trajectory of each rack. Thus, by gravity, the shell opens the jaws and is released.

Such a device involves the action of an operator to activate the release lever.

The invention proposes to do away with the action of an operator.

Furthermore, it is often necessary to maintain a shell locked on a stretcher secured to an automatic loading device for artillery. This maintenance is provided during the pullback or firing phases in order to prevent the shell from being discharged outside the stretcher. The shell is removed from the stretcher using a clamp of a transfer mechanism.

If the device of the prior art is used symmetrically, i.e., with the opening of the jaws upward so as to lock a shell on a stretcher, it will be necessary, in order to release the shell from the stretcher, for the lever to be kept activated during the entire phase for removing the shell with the clamp.

The invention proposes a device for locking shells that is easy to operate, which keeps the jaws in open position, without any action by an operator, during the entire phase for removing the shell from the stretcher. The invention thus makes it possible to time the return of the jaws to a position suitable for their closing, until the shell is completely removed.

Thus, the invention relates to a device for locking a shell, in particular in a stretcher, the device comprising at least one jaw intended to clamp the shell and pivoting between an open position and a closed position around a pivot axis parallel to a longitudinal axis of the shell, the pivot axis of the jaw being located between an upper end and a lower end of the jaw, the lower end of the jaw being intended to receive the shell to allow it to close, the locking device comprising a cam and a pivoting lever, the lower end of the jaw comprising a notch intended to interfere with a catch of the cam for retaining the jaw in the closed position, the cam being secured to the pivoting lever, the pivoting of the lever thus allowing the catch to be moved clear from the rotating path of the notch of the jaw, which allows the jaw to open, the device being characterized in that the lever is intended to be pivotally activated by the pushing of an external member such as a shell transport means, the locking device comprising a first spring and a second spring each acting on the lever in an opposing manner, the second spring being stiffer than the first spring, the effect of the first spring being to bias the lever toward an upper position so as to bring the catch of the cam into contact with the jaw, the second spring being intended to be activated by the pushing of the member and countering the action of the first spring, thus making it possible to delay the lifting of the lever and the locking catch when removing the member.

Advantageously, the locking device comprises a push rod able to transmit the pushing movement from the external member onto the second spring.

Advantageously, the push rod comprises a shoulder, the second spring being a compression spring inserted between the shoulder and the lever.

According to one embodiment, the first spring is a tension spring fixed between the lever and a frame secured to the stretcher.

According to another embodiment, the first spring is a compression spring fixed between the lever and a bottom plate secured to the stretcher.

Advantageously, the locking device comprises a shim forming a stop limiting the pivoting of the lever.

The invention also relates to a receiving stretcher for receiving a shell comprising a locking device according to any one of the previous features.

Advantageously, the receiving stretcher may comprise at least one pair of jaws arranged on either side of the stretcher and facing each other.

According to another embodiment, the receiving stretcher will comprise at least one jaw facing a fixed cradle.

The invention will be better understood upon reading the following description, made in reference to the appended drawings, in which.

The following description will show two embodiments of the invention in parallel so as to facilitate the comparison between the two embodiments.

Figure 1A:
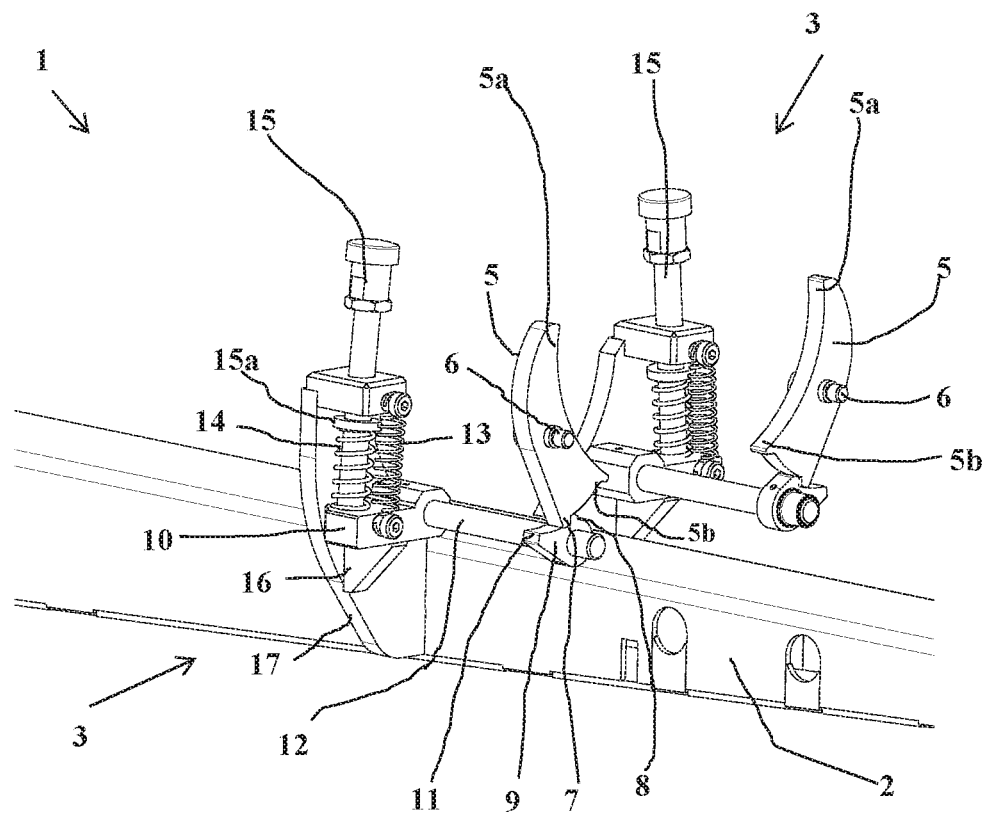
FIG. 1a shows a partial three-quarters view of a device according to a first embodiment of the invention, in open position awaiting a shell or after the removal of a shell.

According to FIG. 1a, a shell holding device 1 comprises a stretcher 2 intended to be secured to an artillery piece (artillery piece not shown) and a locking device according to a first embodiment of the invention.

The holding device 1 here comprises at least two locking devices 3 arranged symmetrically on either side of the stretcher 2.

Each locking device 3 comprises a jaw 5 facing the jaw 5 of the other locking device 3.

For each locking device 3, the jaw 5 is able to pivot between an open position and a closed position around a pivot axis 6 parallel to the longitudinal axis 101 of a shell 100 visible in FIGS. 2 to 5.

The pivot axis 6 of each jaw 5 is located between an upper end 5a and a lower end 5b of the jaw 5. Each pivot axis 6 is housed in a bushing secured to the stretcher and not shown in these schematic views, which only show the main members and their kinematics.

Figure 1B:
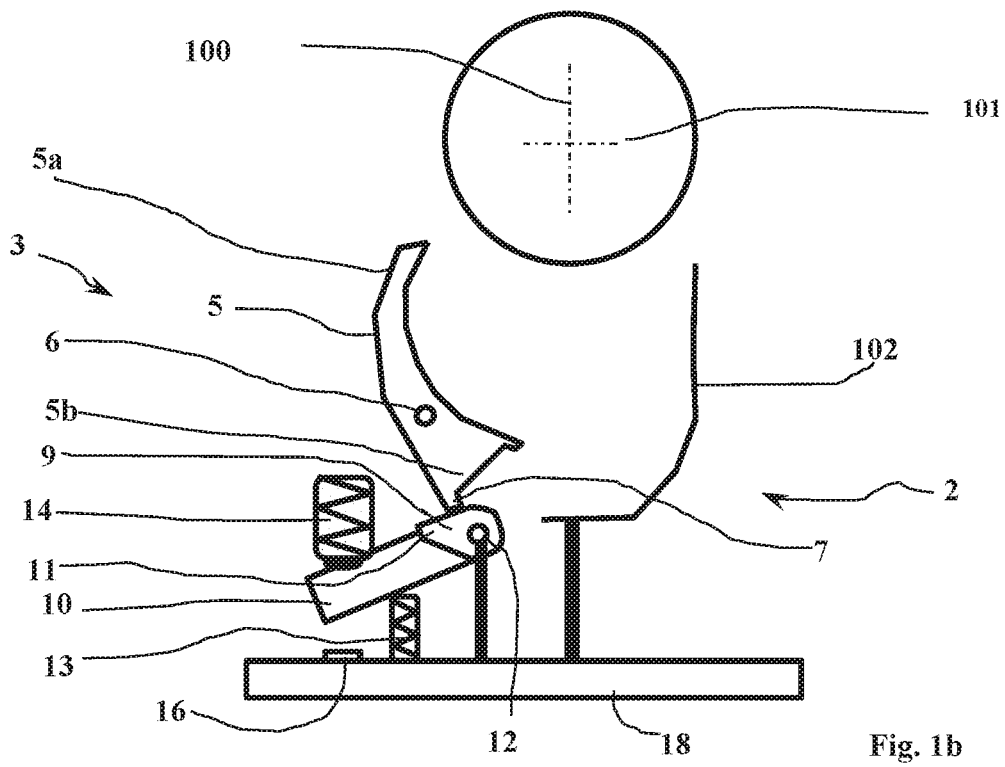
FIG. 1b shows a schematic cross-sectional view of a device according to a second embodiment of the invention, in open position waiting for a shell or after the removal of a shell.

FIG. 1b shows a second embodiment of the invention that differs from the first embodiment in that it includes only one locking device 3. The locking device 3 is secured to the stretcher 2 and it faces a fixed cradle 102, able to receive a shell 100 and support the latter by its lower portion and one side.

Figure 2A:
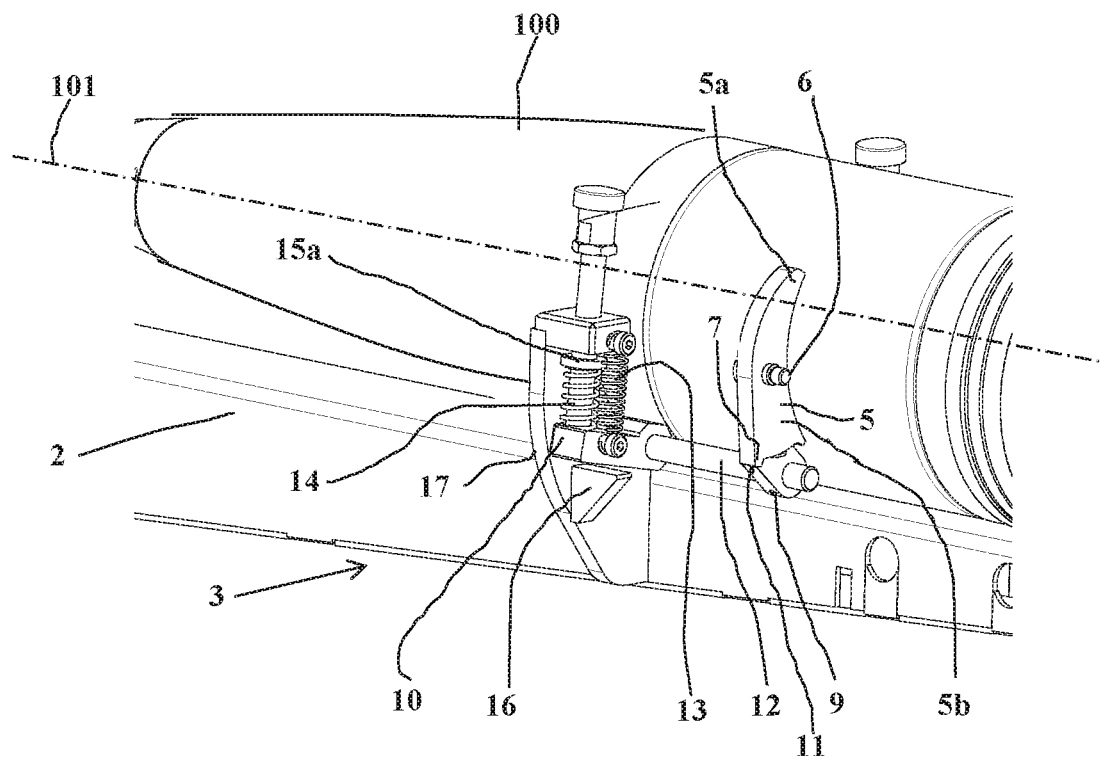
FIG. 2a shows a three-quarters view of the device according to the first embodiment of the invention in closed position and holding a shell.
Figure 2B:
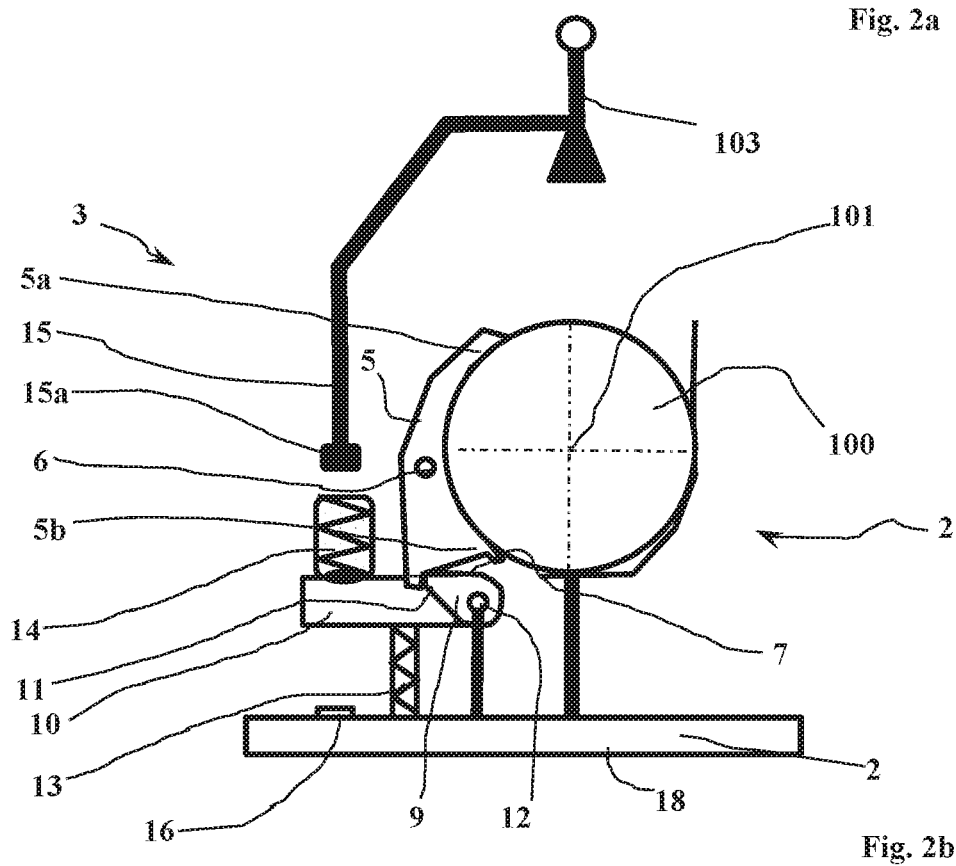
FIG. 2b shows a schematic cross-sectional view of the device according to the second embodiment of the invention in closed position and holding a shell.

According to FIGS. 2a and 2b, which establish a parallel between the two embodiments, the lower end 5b of the jaw 5 allows in all cases to close the jaw 5 by bearing of the shell 100 on this lower end 5b, which causes the pivoting of the jaw 5.

Still according to FIGS. 2a and 2b, when a shell 100 is deposited on the stretcher 2, the jaw 5 of the locking device 3 is closed on the shell 100 and grips it. It will be noted that the lower end 5b of the jaw 5 includes a notch 7 intended to interfere with a catch 11 of a cam 9 to keep the jaw 5 in the closed position (FIGS. 2a and 2b). The cam 9 is secured in rotation with a lever 10 by a rod 12 that is pivotally mounted on bushings not shown and secured to the stretcher 2. One of the bushings is in particular carried by a frame 17 visible in FIGS. 1a, 2a, 3a, 4a and 5a.

According to the first embodiment, each locking device 3 includes a first spring 13, which is a tension spring, and a first end of which is attached to the lever 10 and a second end of which is attached to the frame 17. This first spring 13 tends to lift the lever 10 towards an upper position, which results in keeping the catch 11 in contact with the lower part 5b of the jaw 5.

According to the second embodiment of FIGS. 1b, 2b, 3b, 4b and 5b, it is a compression spring 13 that is located between a bottom plate 18 secured to the stretcher 2 and the lever 10. This compression spring, arranged below the lever 10, has the same lifting effect of the lever 10 as the tension spring of the first embodiment.

According to the first embodiment, a second spring 14, which is a compression spring and which is stiffer than the first spring 13, bears between the lever 10 and a shoulder 15a of a push rod 15. The first spring 13 and the second spring 14 are arranged so as to act in an opposing manner on the lever 10, i.e., the force exerted by one spring on the lever 10 creates a torque in the direction opposite the torque created by the other spring.

The push rod 15 is intended to interfere with a bearing surface of an external member, which here is a shell transport means, not shown, in particular comprising a shell clamp.

According to the second embodiment and as illustrated in FIG. 2b, the push rod 15 and the shoulder 15a are part of the external member formed by the transport means 103.

Figure 3A:
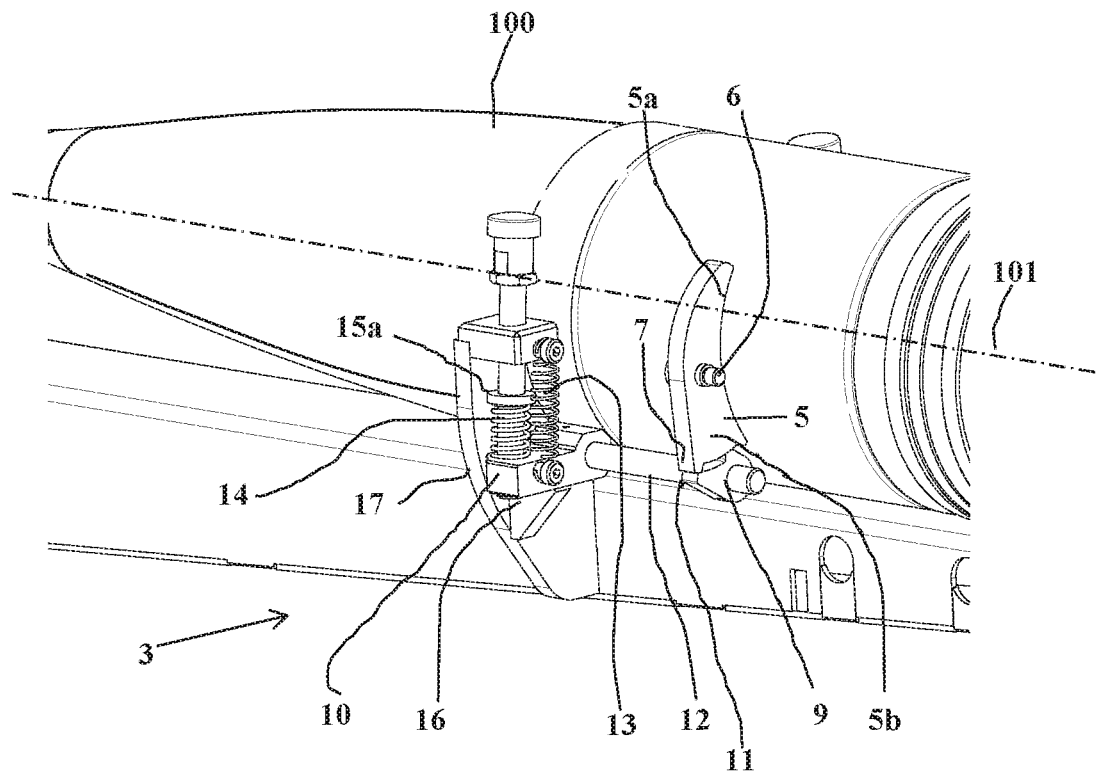
FIG. 3a shows a three-quarters view of the device according to the first embodiment of the invention and during a first step for releasing the shell.
Figure 3B:
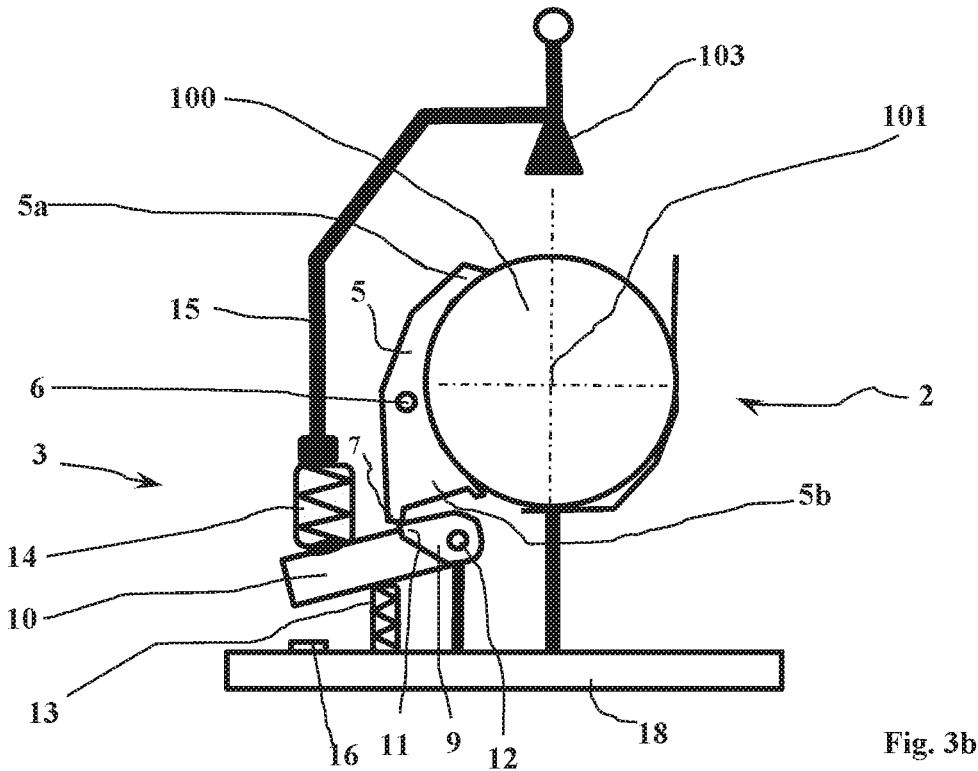
FIG. 3b shows a schematic cross-sectional view of the device according to the second embodiment of the invention and during a first step for releasing the shell.

According to FIGS. 3a and 3b, the bearing of the push rod 15 on the second spring 14 pushes said spring 14, which then pushes the free end of the lever 10, which pivots against the action of the first spring 13 and moves the catch 11 clear of the rotating path of the notch 7 of the jaw 5.

Figure 4A:
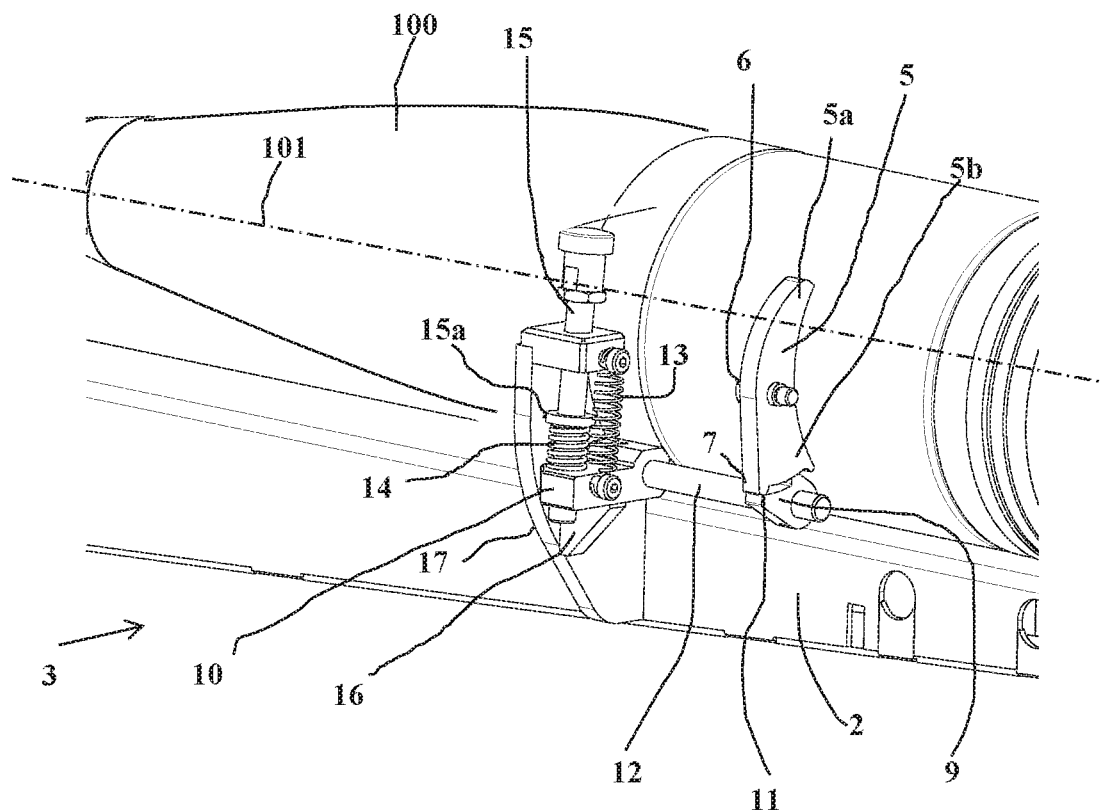
FIG. 4a shows a three-quarters view of the device according to the first embodiment of the invention and during a second step for releasing the shell.

According to FIG. 4a, from this angular position of the lever 10, in which the catch 11 is moved clear of the rotating path of the notch, a shim 16 blocks the pivoting of the lever 10.

By continuing the pushing of the external member on the push rod 15 (FIG. 4a) or on the second spring (FIG. 4b), the second spring 14 is then gradually compressed up to a maximum value that is obtained for the maximum vertical travel of the external member formed by the shell transport means, which can then grasp the shell 100. The second spring 14 is therefore only compressed from an angular position of the lever 10 in which the catch 11 is moved clear of the rotating path of the notch 7.

Figure 4B:
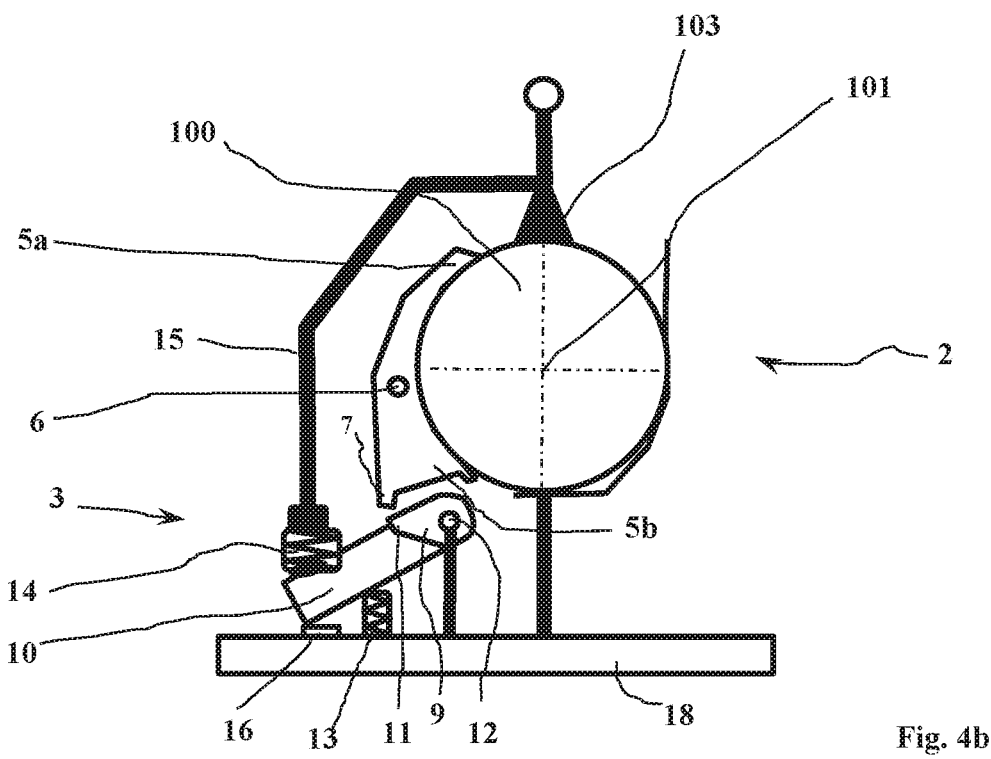
FIG. 4b shows a schematic cross-sectional view of the device according to the second embodiment of the invention and during a second step for releasing the shell.

Regarding the second embodiment, FIGS. 3b and 4b better show the phenomenon.

When the shell 100 is raised, the locking device 3 will simultaneously undergo the gradual decompression of the second spring 14, which, being stiffer than the first spring 13, will supply a downward force that will, during a certain time, counter the upward force exerted by the first spring 13, thus delaying the raising of the lever 10 and therefore the return of the catch 11 to the upper position.

Figure 5A:
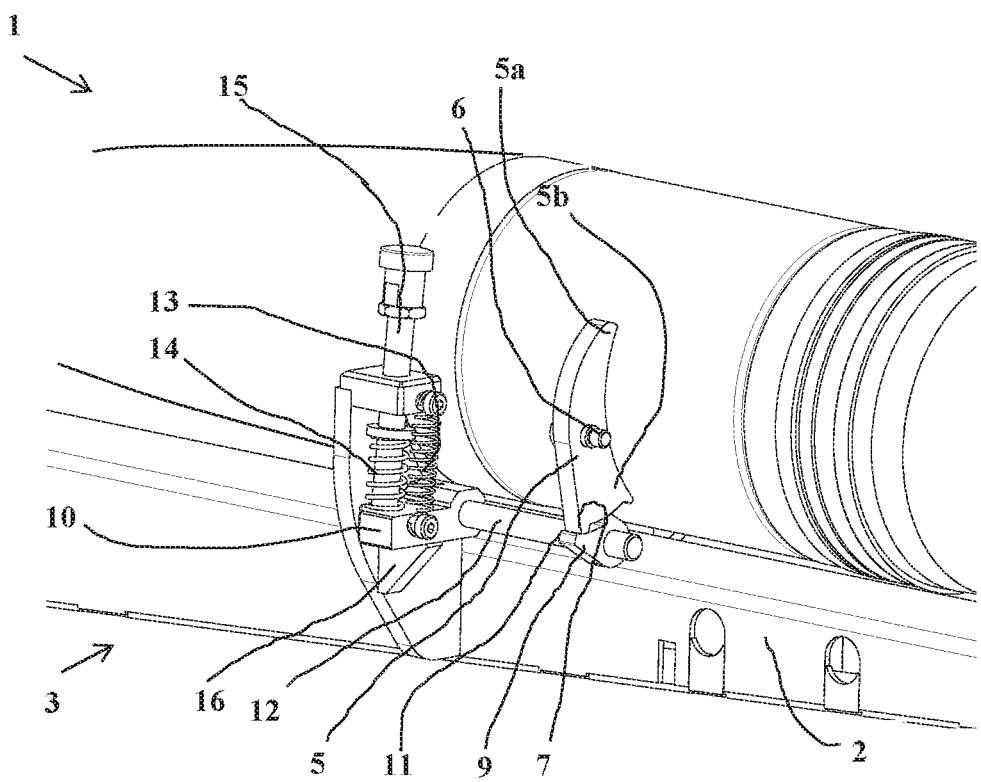
FIG. 5a shows a three-quarters view of the device according to the first embodiment of the invention and during a third step for releasing the shell.
Figure 5B:
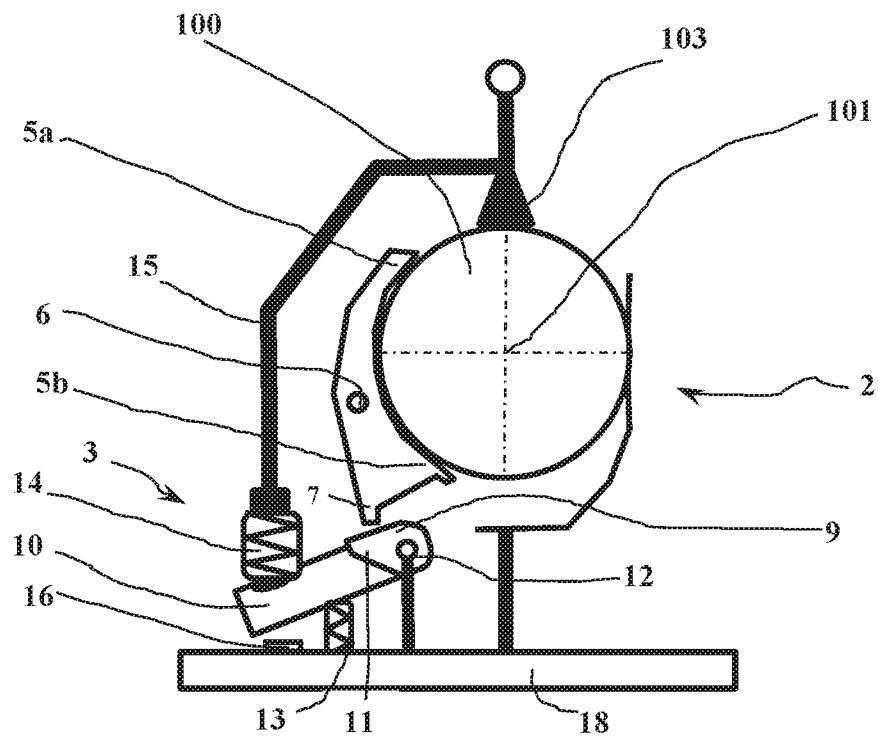
FIG. 5b shows a schematic cross-sectional view of the device according to the second embodiment of the invention and during a third step for releasing the shell.

In so doing, the raising of the grasped shell 100 causes the opening of the jaws 5, which will pivot and place the notch 7 above the possible interference zone with the catch 11, as shown in FIGS. 5a and 5b. The gradual decompression of the second spring 14 will be done up to a force value lower than the tension exerted in the first spring 13, which will then raise the lever 10 and therefore the cam 9 and its catch 11 against the lower end 5b of the open jaw 5, as shown in FIGS. 1a and 1b.

It will be noted in FIG. 1a that the cam 9 comprises a stop 8 intended to limit the opening travel of the jaw 5 by interference with the notch 7.

In this position, the jaws are separated, ready to receive a new shell, the placement of which between the jaws 5 will cause them to close, as mentioned above. The notch 7 will then pivot and again be found interfering with the catch 11 of the cam 9.

The invention thus makes it possible, without any action by an operator, to open and close the jaws 5 of a device for holding shells 100, and the invention makes it possible to time the placing of the jaws back in an open position capable of closing on a shell while waiting for the shell to be completely removed.

The first embodiment of the invention has been described while implementing at least one pair of jaws 5. It is of course possible to provide several pairs of jaws, for example two pairs arranged at a distance from each other, to secure the locking of the shell.

Similarly, the second embodiment, that has been described while showing only a single jaw facing a fixed cradle, may comprise at least one other jaw, also facing the fixed cradle and arranged at a distance from the first jaw, still to secure the locking of the shell.

The invention has been described here in an application of the locking device to lock a shell on a stretcher. It could also be implemented to produce a clamp for grasping a shell. To that end, it suffices to consider the means arranged symmetrically relative to a horizontal plane. The clamp will cooperate to control its opening with an external member that will then no longer be carried by a transport means, but that will be arranged in a fixed manner and secured to the weapon at a zone where the clamp must pick up or deposit the shell.

The invention claimed is:

1. A locking device for locking a shell, the locking device comprising:

at least one jaw configured to clamp the shell and pivot between an open position and a closed position, a pivot axis of the at least one jaw being parallel to a longitudinal axis of the shell and located between an upper end and a lower end of the at least one jaw, the lower end of the at least one jaw being configured to receive the shell to allow the at least one jaw to close;

a cam secured to a pivoting lever, the lower end of the at least one jaw including a notch formed into a first end of the at least one jaw and configured to interfere with a catch of the cam in order to retain the at least one jaw in the closed position, the pivoting lever being configured to pivot so as to allow the catch to move clear from a rotating path of the notch of the at least one jaw and allow the at least one jaw to open, the pivoting lever being configured to be pivotally activated by pushing of an external member; and a first spring and a second spring each directly acting on the pivoting lever in opposite directions, the second spring having a greater stiffness than a stiffness of the first spring, the first spring being configured to bias the pivoting lever toward an upper position such that the catch of the cam contacts the at least one jaw, the second spring being configured to be activated by the pushing of the external member and counter an action of the first spring so as to delay a lifting of the pivoting lever and the catch when the external member is removed.

2. The locking device according to claim 1, comprising a push rod able to transmit a pushing movement from the external member onto the second spring.

3. The locking device according to claim 2, wherein the push rod comprises a shoulder, the second spring being a compression spring inserted between the shoulder and the pivoting lever.

4. The locking device according to claim 1, wherein:
the locking device is for locking the shell in a stretcher, and
the first spring is a tension spring fixed between the pivoting lever and a frame secured to the stretcher.

5. The locking device according to claim 1, wherein:
the locking device is for locking the shell in a stretcher, and
the first spring is a compression spring fixed between the pivoting lever and a bottom plate secured to the stretcher.

6. The locking device according to claim 1, comprising a shim forming a stop that limits pivoting of the pivoting lever.

7. A receiving stretcher for receiving the shell comprising the locking device according to claim 1.

8. The receiving stretcher according to claim 7, comprising
at least one pair of jaws arranged on either side of the receiving stretcher and facing each other.

9. The receiving stretcher according to claim 7, comprising
at least one jaw facing a fixed cradle.

* * * * *